United States Patent
Ramachandran et al.

(10) Patent No.: US 7,515,929 B2
(45) Date of Patent: Apr. 7, 2009

(54) RECEIVER FOR A MULTIMODE RADIO

(75) Inventors: Balasubramanian Ramachandran, Irvine, CA (US); John E. Vasa, Irvine, CA (US); Tudor Lipan, Ottawa (CA); Norman J Beamish, Costa Mesa, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 661 days.

(21) Appl. No.: 11/116,086

(22) Filed: Apr. 27, 2005

(65) Prior Publication Data

US 2006/0246942 A1 Nov. 2, 2006

(51) Int. Cl.
*H04M 1/00* (2006.01)

(52) U.S. Cl. ............ 455/550.1; 455/553.1; 455/168.1; 455/240.1; 455/552.1

(58) Field of Classification Search ............ 455/422.1, 455/450, 456.1, 553.1, 550.1, 73, 78, 168.1, 455/240.1, 234.1, 239.1, 552.1, 245.1; 375/219, 375/232, 216, 229, 233, 316, 136, 141, 143, 375/152, 343, 148
See application file for complete search history.

(56) References Cited

U.S. PATENT DOCUMENTS

| | | | | |
|---|---|---|---|---|
| 5,140,541 | A * | 8/1992 | Sakata et al. | 708/322 |
| 6,577,258 | B2 * | 6/2003 | Ruha et al. | 341/143 |
| 6,791,995 | B1 * | 9/2004 | Azenkot et al. | 370/436 |
| 7,065,133 | B1 * | 6/2006 | Phanse et al. | 375/219 |
| 7,076,225 | B2 * | 7/2006 | Li et al. | 455/245.1 |
| 7,099,302 | B2 * | 8/2006 | Kirshenboim et al. | 370/352 |
| 2002/0066011 | A1 | 5/2002 | Vialen et al. | |
| 2003/0078037 | A1 * | 4/2003 | Auckland et al. | 455/422 |
| 2003/0138030 | A1 * | 7/2003 | Gavnoudias et al. | 375/141 |
| 2003/0186665 | A1 * | 10/2003 | Black et al. | 455/240.1 |
| 2004/0132488 | A1 * | 7/2004 | Hidehiro et al. | 455/552.1 |
| 2004/0204035 | A1 * | 10/2004 | Raghuram et al. | 455/553.1 |
| 2005/0094744 | A1 * | 5/2005 | Ramachandran et al. | 375/316 |
| 2006/0126702 | A1 * | 6/2006 | Burdett | 375/136 |
| 2007/0066245 | A1 * | 3/2007 | Snider | 455/78 |
| 2007/0243832 | A1 * | 10/2007 | Park et al. | 455/73 |
| 2007/0265018 | A1 * | 11/2007 | Feher | 455/456.1 |
| 2008/0051129 | A1 * | 2/2008 | Abe et al. | 455/550.1 |

FOREIGN PATENT DOCUMENTS

WO WO 99/09721 A1 2/1999
WO WO 03/041312 A1 5/2003

* cited by examiner

*Primary Examiner*—Sujatha Sharma

(57) ABSTRACT

A receiver for a multi-mode wireless device is provided. The receiver has multiple analog RF front end modules, with each module supporting a different mode of operation. The receiver has a single digital backend module for generating a digital baseband signal. A controller selects one of the available RF modules to use, and the selected RF module provides an analog communication signal to the digital backend. Each available mode has an associated set of factors. When a particular mode is selected, the set of factors associated with the selected mode is provided to the digital backend. The digital backend uses these factors to adjust the processing characteristics of its components, such as its analog to digital converter, filters, and gain controller. In this way, the single digital backend is adaptable to the requirements of each of the available radio modes.

19 Claims, 8 Drawing Sheets

CDMA Specific Factors:

X— Attenuation [log scale]
    D— Data signal [linear scale]

- Dynamic range:    0 - 96.1415 dB
- Resolution:    0.1881 dB
- Max Error:    +/- 0.0560 dB

- Attenuation adjustment:
  - Multiplicative: 0 - 1.9921875; resolution 0.0078125
  - Additive: +/- 96.1415 dB; resolution 0.1881 dB

RECEIVER FOR A MULTIMODE RADIO

BACKGROUND

The field of the present invention is receivers for wireless mobile devices. More particularly, the invention relates to a receiver module for a multimode radio.

Wireless devices are in wide use today, and users have an expectation that their wireless devices will operate nearly everywhere. However, the world has many different wireless communication standards, so for increased coverage, it is often necessary for a wireless device to support two or more standards. Such a wireless device is often referred to as a multi-mode device, as it has multiple radios to support its various operational modes. For example, a wireless mobile handset may support both a GSM mode and a CDMA mode. Typically, the handset will prefer one of the modes, and when powering up, will first determine if the preferred mode is available. If the preferred mode is not available, or if the preferred mode is dropped during operation, then the device will deactivate the preferred radio, and attempt to operate on the less-preferred mode. In another example, the wireless device may support GPS position location. Generally, the wireless device will deactivate all other radios while receiving GPS data. Since the GPS signal is relatively weak as compared to other communication signals, other active radios could significantly interfere with the reception of the GPS signals. In yet another example, a wireless mobile device may support several data transmission standards, such as Bluetooth®, 802.11, or a 3G telecommunications standard such as CDMA-HDR or WCDMA. In a similar manner as discussed above, typically, the device will prefer one of the data modes, and when powering up, will first determine if the preferred mode is available. If the preferred mode is not available, or if the preferred mode is dropped, then the device will deactivate the preferred radio, and attempt to operate on the less-preferred mode.

Wireless communication systems transmit and receive modulated radio frequency (RF) signals, generally in accord with one or more telecommunications standard. These telecommunication standards, such as GSM, CDMA, WCDMA, CDMA2000, UTMS, PDC, PHS, and others, generally set out specific and precise modes of operation. In a similar manner, several data transmission standards, such as Bluetooth, 802.11, and 3G also operate according to specific and precise modes of operation. Typically, each mode operates in a different frequency band, has different filter and signal conditioning requirements, and has different demodulation requirements. These differences not only affect the RF analog receive chain, but require different processing in the baseband frequency. Accordingly, a typical multi-mode radio will have a separate receiver module for each supported mode.

Although users have expectations that devices will work nearly everywhere, and are demanding more features and greater reliability, the physical size of the wireless devices is shrinking. With space already limited, and users demanding high-end features such as video cameras and music players, the space available for radio devices is shrinking quite dramatically. Further, each radio chain, even if deactivated, typically consumes at least some power. So even when a multimode device is operating in one mode, each of the other available radios is likely to be drawing at least some power. And in a portable device, with its limited battery life, the conservation of power is critical. Accordingly, there is a desire to include more radio modes on a wireless device, but limited space and power limitations need to be considered.

SUMMARY

Briefly, the present invention provides a receiver for a multi-mode wireless device. The receiver has multiple analog RF front end modules, with each module supporting a different mode of operation. The receiver has a single digital backend module for generating a digital baseband signal. A controller selects one of the available RF modules to use, and the selected RF module provides an analog communication signal to the digital backend. Each available mode has an associated set of factors. When a particular mode is selected, the set of factors associated with the selected mode is provided to the digital backend. The digital backend uses these factors to adjust the processing characteristics of its components, such as its analog to digital converter, filters, and gain controller. In this way; the single digital backend is adaptable to the requirements of each of the available radio modes.

In one example, the receiver has at least two communication modes, such as GSM and CDMA. Each mode has its own RF analog receive chain, as well as its own set of factors. In an alternate embodiment, the GSM and CDMA modes may share components in the RF analog receive chain. When one of the radio modes is active, the associated analog receive chain is connected to the digital backend, and the factors for that mode are provided to the backend components and processes. The factors set or adjust the characteristics and coefficients for the digital backend to comply with the requirements of the selected mode. For example, if the CDMA mode is selected, then the CDMA RF analog chain will operate, and the output from the CDMA front end will be provided to the digital backend. The digital backend will use the CDMA-specific factors in its components and processes. In this way, the analog to digital converter, decimation filter, channel selector, and gain controller will each operate according to standard CDMA requirements. In a particular example of the CDMA factors, the automatic gain controller will be set to operate a dB linear gain having 96 dB dynamic range with at least a 0.2 dB resolution. To accommodate these requirements, a gain control signal is separated into a coarse adjustment and a fine adjustment. The coarse-adjustment is used to apply a bit shift to a digital data stream, while the fine adjustment is used to interpolate between the coarse settings. For even finer control, a look-up table may be used to apply fine corrections.

Advantageously, the disclosed receiver enables a single digital backend to adapt to each of the available radio modes. In this way, multiple radio modes may be made available on a wireless device, while conserving component space and power.

BRIEF DESCRIPTION OF THE DRAWINGS

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views. It will also be understood that certain components and details may not appear in the figures to assist in more clearly describing the invention.

DETAILED DESCRIPTION

Figure 1:
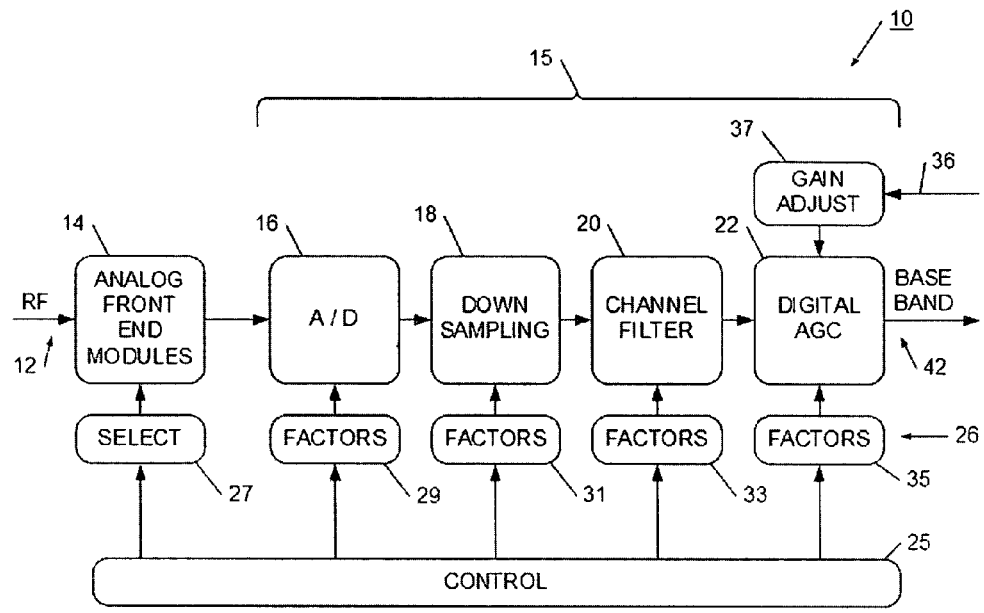
FIG. 1 is a simplified block diagram of a wireless receiver having an adaptable digital backend in accordance with the present invention.

Referring now to FIG. 1, a communication receiver is illustrated. Communication receiver 10 may operate, for example, as part of a radio system for a telecommunications device. In one example, the telecommunications device is a mobile wireless telephone handset. Generally, the communication receiver 10 receives a radio frequency (RF) communication signal at an antenna, and routes the RF communication signal 12 to an analog front end 14. The RF signal 12 will generally be compliant with one of several telecommunications standards. Such standards may include, for example, CDMA, WCDMA, UMTS, GSM, PCS, cellular, or GPS. It will be appreciated that other telecommunication or data standards may be used. The analog front end 14 passes the analog communication signal to a digital backend module 15, where the analog signal is processed into a baseband digital communication signal 42. Communication receiver 10 has multiple analog front end modules 14, with each module associated with a particular communication standard, or sharing components to support a particular communication standard. For example, the communication receiver may have an analog front end module for receiving CDMA signals, and another analog front end module for receiving a GSM signal. Although the communication receiver 10 has multiple analog front end modules 14, it has only one digital backend module 15. By selecting one of the analog front end modules, and associating proper factors with the digital backend module 15, a single digital backend module 15 may support multiple analog front-end modules 14. In this way, a multi-mode receiver 10 may be constructed in a smaller space and with using less power than with previous constructions.

The communication receiver 10 has a control circuit 25 for selecting one of the available analog front end modules 14 to be operational. This control 25 may be automatic, for example, allowing the wireless handset to automatically change radio modes, selecting components or front end modules 14, or may have a manual input for assisting in making the mode selection. The control couples with a selection module 27 for selecting the mode that is to be operational. The selection process may include switching the analog signal from the selected analog front end to the digital backend module 15. The selection 27 may also include applying particular signal conditioning to the selected communication signal. For example, different filtering may be desirable for different modes.

The selected analog communication signal is passed from the selected analog front end to the digital backend module 15. The digital backend module 15 includes a high dynamic range analog to digital (A/D) converter 16. When the control 25 is selected the operational analog front end, a set of factors 26 was also selected. The communication receiver 10 has a set of factors predefined for each of the available analog front end modules. Upon selecting a module, the set of factors for the selected module is associated with and used for processing the communication signal. For example, factors are loaded into the A/D factors 29. These A/D factors 29 are then used by the A/D converter 16 in processing the analog communication signal. These factors may include, for example, sample rate, resolution, filtering, and error correction. It will be appreciated that other factors may be selected for particular A/D conversion processes.

The output from the A/D converter 16 is generally a high bit rate digital data stream. This high bit rate digital data stream is received at a down sampling module 18, where the bit rate is reduced. This down sampling, or decimation, process is essential for filtering the high frequency noise from the ADC output such as noise shaped converters as well as reject any interferers that are present outside the desired signal bandwidth. For example, in CDMA, the desired signal bandwidth is 630 kHz while the closest blocker is at 900 kHz offset from the carrier frequency. This enables simplified processing through the remainder of the digital backend module 15. The requirements, or even the necessity, for down sampling may change dependent on the selected analog front-end module. Accordingly, down sampling factors 31 may be used to set coefficients in the down sampling process. The decimated signal from the down sampling process 18 is then sent to a channel filter 20. The channel filter 20 further processes the digital data to pass communication data compliant with the selected communication standard. After the decimation process, certain standards may allow implementation of removal of DC using high pass filters. These filters can be programmed in terms of their cut off frequency and order as well. Accordingly, specific channel filter of factors 33 are used to set the channel filter. For example, the factors may include coefficients directed to setting specific frequency bands, filter topologies, and filter rolloffs. The output from the channel filter 20 is then received at a digital automatic gain control (AGC) module 22. The AGC is used to normalize or otherwise scale the gain of the digital signal. In wireless systems, the received signal at the antenna widely varies in power and may be as much as 90 dB. Before this signal is demodulated, it needs to be normalized to a level suitable for the demodulator and this process is accomplished using automatic gain control (AGC). Since each telecommunications standard has specific requirements for signal gain, gain factors 35 are set according to the selected analog front end. In this way, the digital AGC processes the digital data to have gain characteristics appropriate for the selected telecommunications standard. The digital AGC module 22 receives a gain adjustment signal 36, which is used to adjust the gain characteristics of the AGC module. The gain adjustment signal may be generated in baseband circuitry, may be generated in the receiver, or may be generated in other sections of the radio or controller. The specific process used to generate the AGC adjustment signal is dependent on overall radio design, as well as the specific telecommunications standard being used. The generation of a gain adjustment signal is well known, so will not be discussed in detail.

Advantageously, the communication receiver 10 allows a single digital backend module 15 to cooperate with one of several available analog front end radio systems. In this way, a multimode radio receiver may be implemented in a particularly efficient manner. Although the communication receiver 10 has been described with reference to telecommunications standards, it will be appreciated that other communication or data standards may be used. For example, the factors for the digital backend module may be selected to process satellite radio broadcasts, emergency band broadcasts, aircraft band broadcasts, proprietary radio communications, Bluetooth, 802.11, 3G, or other communication and data standards. Advantageously, the digital backend module may be adjusted to accommodate a wide range of analog front end modules.

It will be understood that the digital backend may be constructed using separate components, or may be constructed in one or more integrated devices. It will also be understood that the digital backend may be implemented using processes operating on a digital signal processor (DSP) or other processor. In one example, the digital backend and analog front end modules are packaged together in a single package on a common substrate as a multi-chip module.

Figure 2:
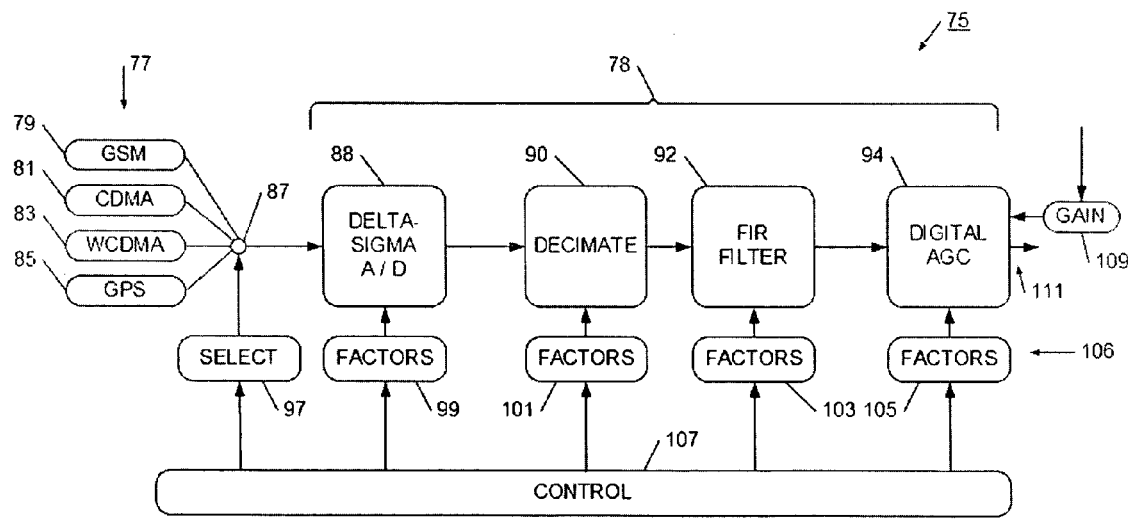
FIG. 2 is a simplified block diagram of a wireless receiver having an adaptable digital backend in accordance with the present invention.

Referring now to FIG. 2, a communication receiver 75 is illustrated. Communication receiver 75 is constructed as a multi-mode receiver. Accordingly, the communication receiver 75 has several front end modules 77 available. As illustrated, the front end modules 77 include a GSM module 79, a CDMA module 81, a WCDMA module 83, and a GPS module 85. It will be appreciated that other modules may be used to implement other radio modes. It will also be understood that more or fewer modules may be used. The front end modules 77 couple to a switch 87. A control circuit 107 is used to select which of the available front end modules will be used. Each of the front-end modules 77 has an associated set of factors which are used to properly implement the appropriate and associated telecommunications standard. When the control 107 has selected which front end module to use, the factors associated with the selected front end module are then used as the set of factors 106 for the communication receiver. Of course, if the control selects a different front-end module, then a different set of factors will be used. The control 107 may operate automatically responsive to a transmit/receive controller in the radio. In this way, the control 107 may automatically change modes when a more desirable mode is available. Alternatively, the control 107 may accept manual input from a user. For example, a user may desire the receiver to operate in a GPS mode, and may make a selection to force the receiver 75 to go into that mode.

After the control 107 has selected the front-end module for operation, the select factor is used to direct the switch 87 to pass the analog communication signal from the selected front-end module to the digital backend module 78. The selection factors 97 may also include factors for setting filter or other signal conditioning processes for the analog line. The selected analog signal is received into an A/D converter 88, which may be in the form of a delta-sigma A/D converter. The A/D converter 88 has its coefficients set according to the A/D factors 99. These A/D factors 99 have been set according to the selected analog front end. For example, the factors may adjust the sample rate or resolution of the A/D converter. The output from the A/D converter is decimated in decimate process 90. The decimate process 90 has decimate factors 101 which have been loaded responsive to the selection of a front-end module. The decimate factors may set for example, the particular reduction in rate, resolution, or apply additional filtering. The gain process 109 for the data stream may be adjusted according to the output of a digital automatic gain control module 94.

After the gain has been adjusted, the digital data is received in to a channel filter 92, which may be in the form of a finite impulse response (FIR) filter. Other implementations of the channel select filter such as infinite impulse response (IIR) filters are also possible. The FIR filter has coefficients set by the filter factors 103. The filter factors 103 have been selected particular to the selected front-end module. For example, the filter factors 103 may set the topology of the filter, the rolloff for the filter, and the bandwidth of the filter. It will be appreciated that other filter factors may be set, and may include other types of signal conditioning. The output from the channel filter is then received into the digital automatic gain control 94. Since each telecommunications standards may have differing requirements for dynamic range and resolution, the AGC factors 105 are set specific for the selected front-end module. The actual AGC operation is typically accomplished in the DSP and it outputs a correction word representative of the error signal between the actual output and the desired output.

The digital AGC 94 receives a gain adjustment signal 109, which is used to adjust the gain characteristics of the AGC 94. The gain adjustment signal may be generated in baseband circuitry, may be generated in the receiver, or may be generated in other sections of the radio or controller. The specific process used to generate the AGC adjustment signal is dependent on overall radio design, as well as the specific telecommunications standard being used. The digital AGC 94 may also apply additional filtering and signal conditioning processes, and outputs a digital baseband signal 111. Although not illustrated in FIG. 2, it will also be appreciated that different communication standards may have different antenna requirements. Accordingly, the control 107 may also be used to select from available antenna systems. For example, a satellite radio communication may require a different antenna structure from a CDMA signal. In this way, when the CDMA front-end module is selected, the CDMA antenna will also be selected. In a similar manner, when the satellite radio front-end module is selected, then the satellite antenna will be selected.

Figure 3:
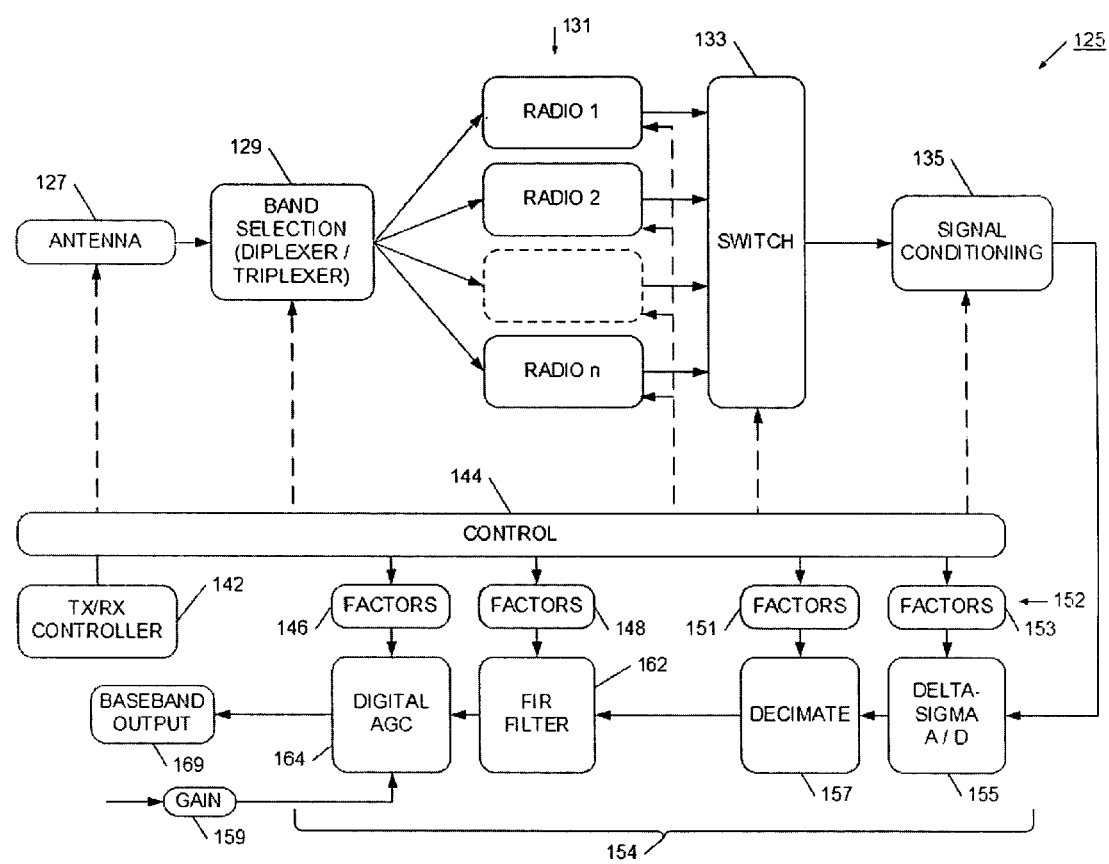
FIG. 3 is a block diagram of a wireless receiver having an adaptable digital backend in accordance with the present invention.

Referring now to FIG. 3 a communication receiver 125 is illustrated. Receiver 125 has an antenna 127 for receiving an RF signal. The antenna 127 passes a signal to a band selection device 129. For example, the band selection device 129 may be a diplexer or triplexer or other band selection device. The band selection device 129 passes RF signals to the front end modules 131. Each front-end module 131 is a radio compliant with a particular communication standard. For example, the radio 1 may be compliant with a CDMA standard, while radio 2 may be compliant with a GPS standard. Since the communication receiver 125 has multiple front end modules, each operating in a different mode, it is typically considered to be a multimode radio. A control 144 is used to select which of the radios 131 is operational. The control 144 also controls a switch 133 for connecting the output of the operational radio to follow-on circuitry. It will be understood that the control 144 may select the operational radio and communication signal in alternative ways. For example, the control may switch communication signals by activating and deactivating particular radio devices. In another example, the switch may physically route outputs of the selected radio to a follow-on circuitry. It will also be understood that the control 144 may also affect other areas of the analog chain. For example, the control could adjust the band selection process 129, or may select a particular antenna or set characteristics for an adjustable antenna.

The selected analog communication signal is output from the switch 133. The analog communication signal may be received by a signal conditioning module 135, which also may have its coefficients adjusted by control 144. The signal conditioning may, for example, remove DC offsets, or further filter the analog signal. The conditioned signal is then received into the A/D converter 155, which in one embodiment may be in the form of a delta-sigma A/D converter. Responsive to the control selecting the desired radio, a set of factors 152 has also been loaded into the digital back 154. A/D factors 153 are then used to particularly set the sampling rates and order for the A/D converter 155. In a similar way, decimate factors 151 are used to set the particular factors and coefficient for the decimate process 157. The order of decimation may be set for different standards depending on the requirements of the converter and interferers. The output from the decimate process 157 is received into the channel select filter 162, which may be a finite impulse response filter. The filter 162 has filter coefficients 148 set according to the particular radio selected. Digital AGC factors 146 are also used to set the factors and coefficient for the digital AGC 164. Factors and coefficients for the digital AGC will include slope, offset which are in effect controlling the range and resolution of the digital AGC block. The digital AGC then outputs a baseband signal 169. The digital AGC 164 receives a gain adjustment signal 159, which is used to adjust the gain characteristics of the AGC module. The gain adjustment signal 159 may be generated in baseband circuitry, may be generated in the receiver, or may be generated in other sections of the radio or control 144. The control 144 may be set by a transmit/receive controller 142, which is part of the wireless device, or may be set according to a manual input.

Figure 4:
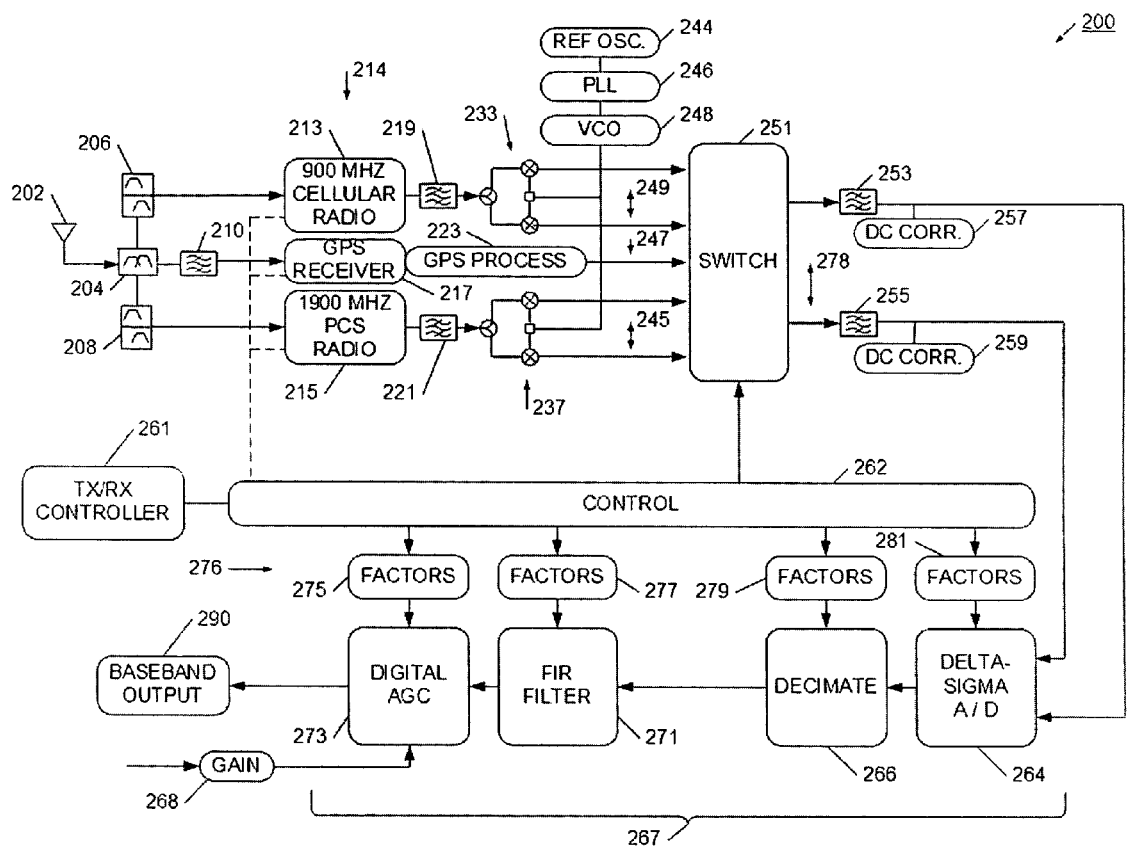
FIG. 4 is a block diagram of a wireless receiver having an adaptable digital backend in accordance with the present invention.

Referring now to FIG. 4, one embodiment of a communication receiver 200 is illustrated. Communication receiver 200 has an antenna 202 configured to receive an RF signal. The antenna signal is received into a triplexer 204. A triplexer 204 separates the incoming signal from antenna 202 into 3 bands. The first band is a 900 MHz cellular radio band. For this band, the signal is received into duplexer 206, which facilitates separation of transmit and receive signals. The communication signal is then received into the 900 MHz cellular radio 213. The triplexer 204 also has a 1900 MHz line which passes through duplexer 208. Duplexer 208 facilitates transmit and receive signals from the 1900 MHz PCS radio 215. A third band from the triplexer 204 passes a GPS signal, which may be filtered by filter 210 before being received into the GPS receiver 217. Although triplexer 204 is used in communication receiver 200, it will be appreciated that other structures may be used to separate bands or modes.

Since the communication receiver 200 is capable of operating in three different radio modes, it is typically referred to as a multimode receiver. A transmit/receive controller 261 may be used to select which one of the radios 214 is to be operational. For example, at startup, the transmit/receive controller 261 may first activate the 1900 MHz radio 215 and search for a communication signal, and if none is found, then deactivate the 1900 MHz radio and activate the 900 MHz radio. In another example, when a user places an emergency voice call, the transmit/receive controller 261 may cause the GPS receiver 217 to be activated, while turning off the non-necessary radios. The transmit/receive controller 261 activates a control process 262 for selecting the radio to the operational. Although not illustrated, the control 262 may also adjust other aspects of the analog signal chain.

The output from the 900 MHz cellular radio is filtered in filter 219. In one example, filter 219 is a surface acoustic wave (SAW) filter. It will be appreciated other types of filters may be used to condition the analog signal. The condition signaled is received into a demodulation process 233, where the RF signal is a mixed with a local oscillator signal. The local oscillator signal is generated by voltage controlled oscillator 248, which in one embodiment is driven by a reference oscillator 244 in conjunction with a phase locked loop 246. In a similar manner, the output from the 1900 MHz PCS radio 215 is filtered in filter 221, and received into demodulation process 237. Depending on the radio selected, the controls 262 may adjust the settings of the reference oscillator 244 or VCO 248. The GPS signal from GPS receiver is received into the GPS process 223. The GPS process 223 provides filtering and other conditioning to the GPS signal.

A switch 251 is operated responsive to the control 262. In this way, the switch 251 may select which of the bands to switch through to the digital backend 267. Since the output from the demodulation processes are shown with both an I and a Q output, the switch is shown with both an I and a Q output 278 for the illustrative purposes. The output from the switch 251 is received into the filters 253 and 255. The filters 253 and 255 act to reduce noise, remove blockers, and reduced jammers. As the analog lines may also have a DC offset, a DC correction 257 and 259 may be applied to the analog signal. In this way, the analog to digital conversion may be accomplished more accurately and efficiently. The conditioned analog signals are then received into the digital backend 267. More particularly, the analog communication signals are received into an A/D converter 264. When the control 262 selected the operational radio, it also loaded a set of factors 276 particular to the selected radio and its associated telecommunications standard. More particularly, A/D factors were loaded into factors 281, decimate factors were loaded into factors 279, filter factors were loaded into factors 277, and AGC factors were loaded into factors 275. In this way, each process or component in the digital backend 267 has its particular coefficients and constraints defined according to the selected telecommunications standard. For example, the sample rate and resolution for the A/D converter would be set by the A/D converter factors 281. In a similar manner, the decimate factors would be set through decimate factors 279.

The output from the decimate process 266 is received into a channel select filter 271, which has had its filter characteristics set by filter factors 277. The digital AGC 273 has also been set according to the AGC factors 275, and is configured to output a baseband signal 290. The digital AGC 273 receives a gain adjustment signal 268, which is used to adjust the gain characteristics of the AGC. The gain adjustment signal 268 may be generated in other baseband or radio circuitry, or may be generated in by control 262. It will be appreciated that the analog front end for the communication receiver 200 is well known, and therefore will not be described in detail. However, communication receiver 200 facilitates the use of multiple radios 214, which share a single digital backend 267. By selecting and using factors particular to a particular communication standard, the digital backend flexibly adapts to the available analog front end modules or radios.

Figure 5:
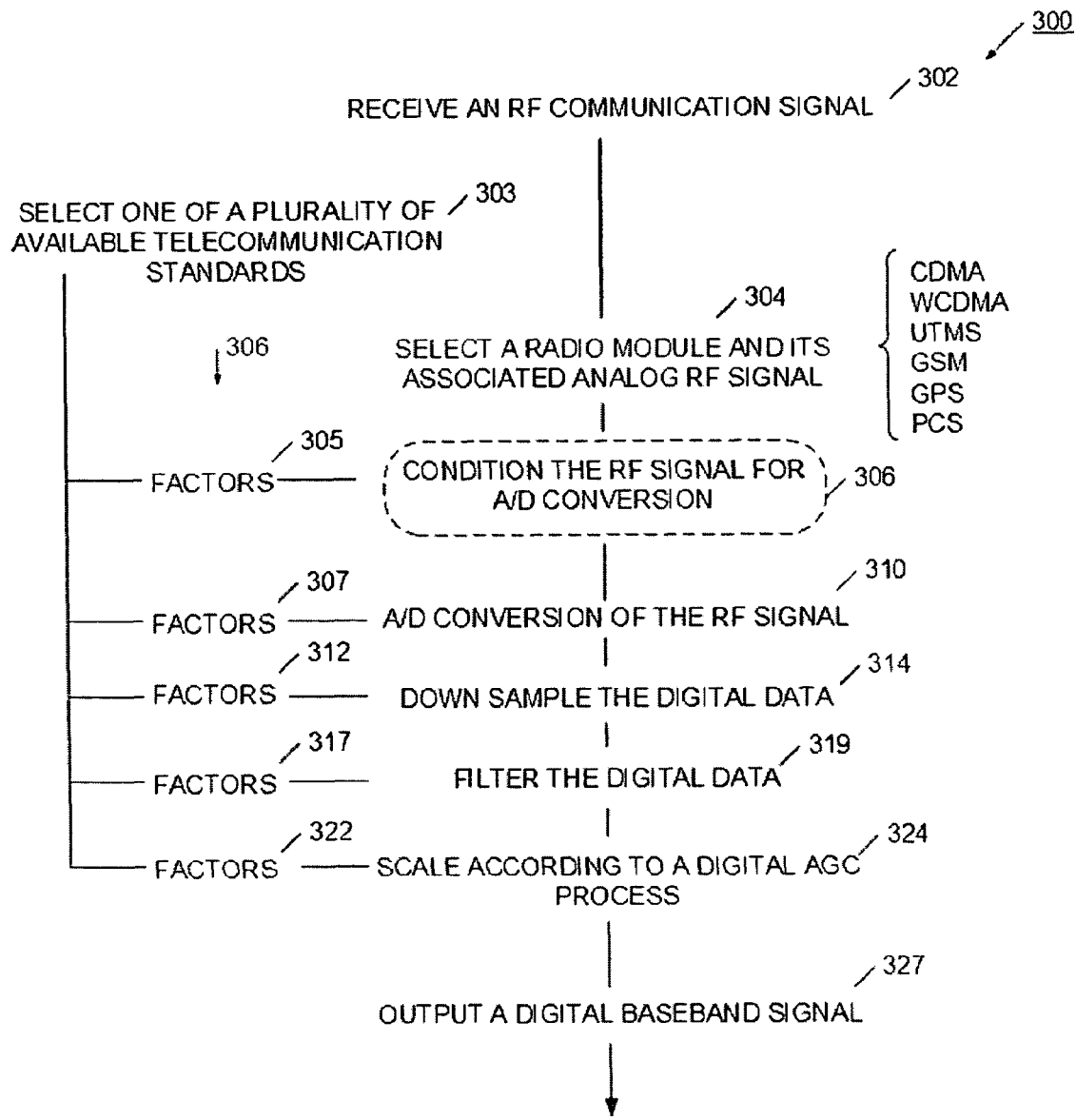
FIG. 5 is a flowchart of a method for generating a baseband signal in accordance with the present invention.

Referring now to FIG. 5, a method for generating a digital baseband signal is illustrated. Method 300 receives an RF communication signal as shown in block 302. The control circuit is used to select one of the plurality of available modes or supported telecommunications standards as shown in block 303. The control circuit also selects a radio module to be operational, and selects its analog output for further processing as shown in block 304. The radio module may be, for example a CDMA radio, a WCDMA radio, a UTMS radio, a GSM radio, a GPS receiver, or a PCS radio. It will be appreciated that other communication or data standards may be used. When the main particular telecommunications standard was selected in block 303, a set of factors 306 was also selected. The set of factors 306 is particular to the selected operational radio and its telecommunication standard. In this way, a single digital backend may be flexibly adapted to each of the available analog radio front ends. For example factors 305 may be used to set properties for filters or other conditioning processes as shown in block 306.

The conditioned signaled is then converted into a digital datastream as shown in block 310. The particular factors used in performing the A/D conversion are set according to the A/D converting factors 307. For example, particular sample rates or resolutions may be set according to the selected operational radio. The output from the A/D converter is then downsampled or decimated as shown the block 314. Again, the particular factors or coefficients for the downsampling or decimation may be set according to factors 312, which are particular to the selected operational radio. The digital data is then filtered as shown in block 319. The topology, the rolloff, and bandwidth of the filter may be set according to the filter factors 317. As above, the filter factors 317 are set according to the then operational radio. The digital datastream is then scaled according to a digital AGC process 324. The digital data may be scaled according to factors 322 for the operational radio. The receiver then outputs a digital baseband signal as shown in block 327.

Figure 6:
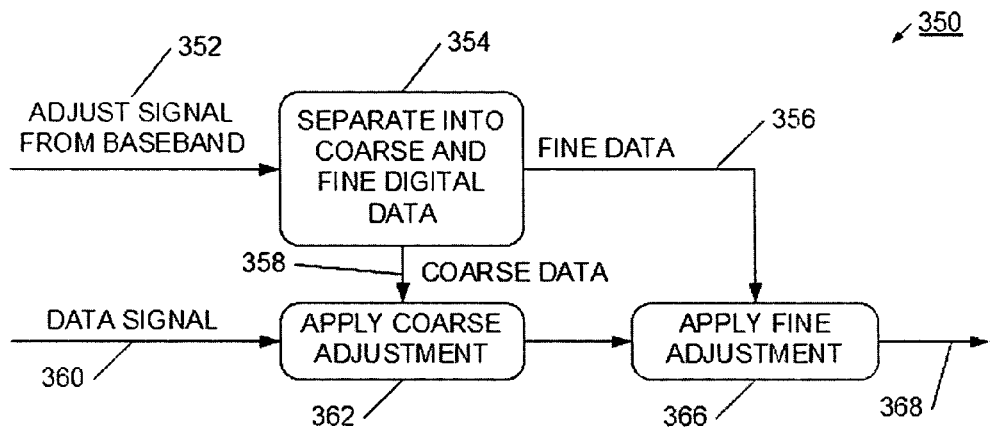
FIG. 6 is a simplified block diagram of an AGC system for a wireless receiver in accordance with the present invention.

Referring now to FIG. 6, an automatic gain control system 350 is illustrated. Automatic gain control system 350 is particularly useful as a digital AGC module for a communication receiver such as communication receiver 10 discussed with reference to FIG. 1. Although AGC 350 is particularly useful in such an application, it will be appreciated that AGC 350 may be used in other applications. For example, AGC 350 may be used in a single mode radio receiver. The AGC 350 receives an adjust signal 352 from a baseband portion of the receiver as shown. The adjust signal 352 is then separated into a coarse data stream 358 and a fine data stream 356 as shown in block 354. The coarse data 358 is then applied in block 362 to the data signal 360. However, to obtain a finer resolution or adjustment, the fine data 356 is then applied to the data signal is shown in block 366. In this way, the output signal 368 may be adjusted with a finer resolution.

Figure 7:
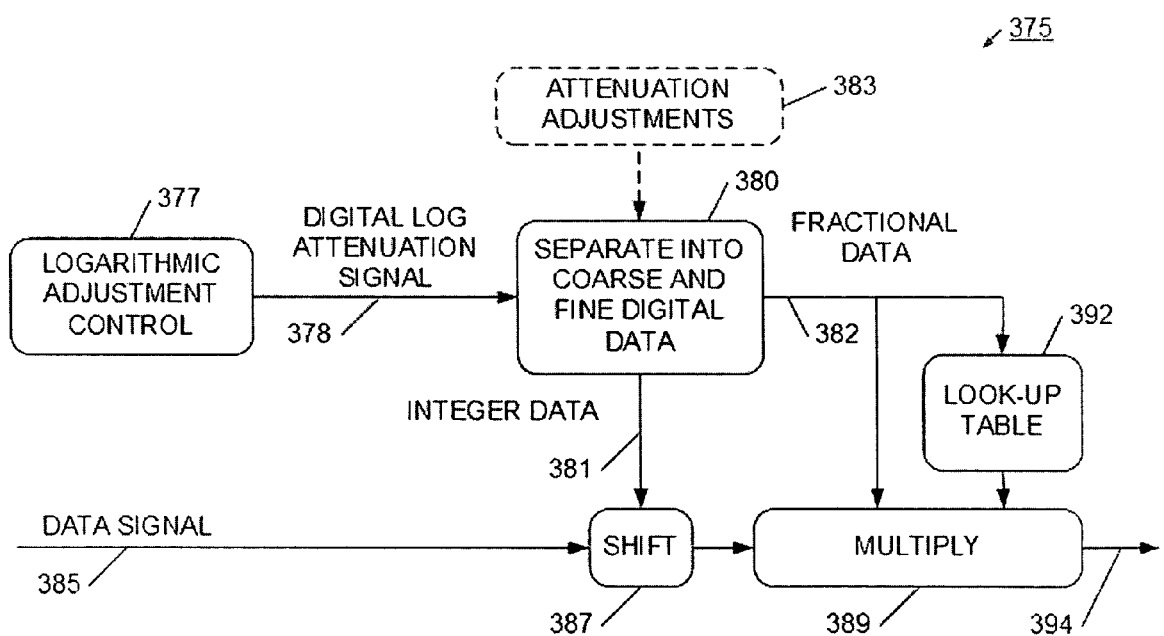
FIG. 7 is a simplified block diagram of an AGC system for a wireless receiver in accordance with the present invention.

Referring now to FIG. 7, another AGC processor 375 is illustrated. AGC system 375 includes a logarithmic adjustment control 377. Since almost all wireless systems entail a wide range of received powers at the antenna (almost 90 dB) therefore, AGC operation is done in such a manner to provide a dB linear output characteristic. In a db linear AGC, the gain, which is measured on a decibel or dB scale, changes substantially linearly in response to a change in the controlling voltage or digital control word. Accordingly, the logarithmic adjustment control 377 provides an attenuation signal 378 for maintaining a dB linear output. The attenuation signal 378 may be provided in a digital format, so that it may easily be separated into coarse data and fine data in block 380. The coarse data may be separated as integer part 381. The fine data may be output as fractional data 382. A digital mainstream 385 is received into a shift process 387. The digital data is shifted according to the integer data 381. It will be appreciated that a single digital bit shift is equivalent to about a 6 dB change in output level. However, some telecommunications standards, such as CDMA and WCDMA, require finer resolution. Accordingly, the output from the shift process 387 is received into a multiply process 389, where the fractional data 382 is applied to the digital data. In this way, adjustments finer than the 6 dB integer settings may be provided. For example, sufficient fractional data may be provided to interpolate to a resolution of about 0.2 dB. It will be appreciated that the number of fractional data bits may be adjusted to provide more or less resolution between integer settings.

To further improve the dB linear response of the AGC system 375, a lookup table 392 may be provided. Then, according to the fractional data 382, the lookup table may provide additional coefficients that can be used to adjust the data signal in block of 389. Also, certain attenuation adjustments 383 may be provided in the system. These attenuation adjustments 383 may be provided during regular operation from other sections of the digital or analog system. In another example, the attenuation adjustments 383 are used to tune or calibrate the AGC system 375, and then not actively used during regular operation.

Figure 8:
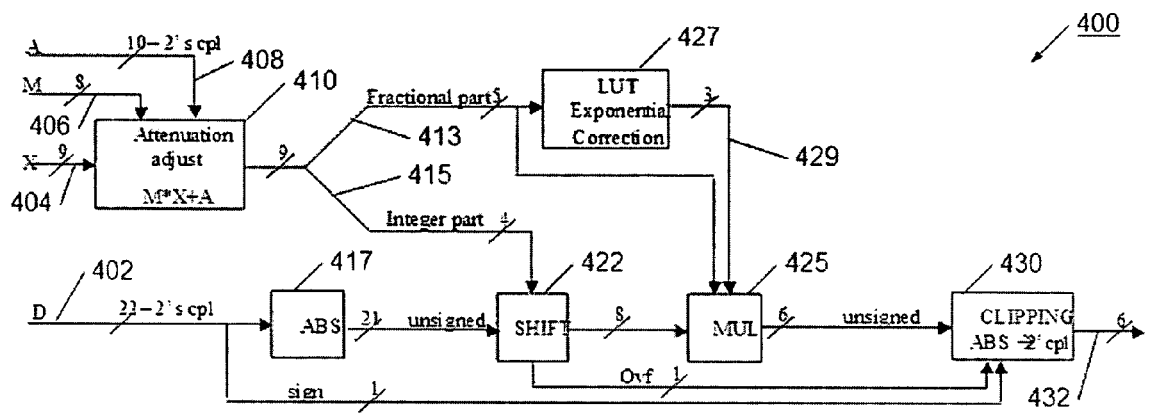
FIG. 8 is a block diagram of an AGC system for a wireless receiver in accordance with the present invention.

Referring now to FIG. 8, another AGC system 400 is illustrated. The AGC system 400 has an attenuation signal 404 received into an attenuation adjust block 410. Attenuation adjustments may be made using line 406 and line 408. These adjustments may be particularly useful for calibration of the system, and after calibration "M" may be set to 1, and "A" may be set to 0, thereby effectively eliminating their effect. In another example, the attenuation adjust lines may be coupled to other sections of the circuit for real-time adjustment of the AGC system 400 during regular operation. The output from the attenuation adjustment block 410 has an integer part 415 and a fractional part 413. As illustrated, the integer part 415 is a 4 bit number, and thereby has 16 states (0-15). Digital communication data is received on line 402, with its absolute value taken in block 417. The sign data is provided to later processing functions, while the unsigned data is passed to shift register 422. The shift register shifts the digital data according to the integer received on line 415.

The AGC system 400 is shown configured for use in a CDMA system. Accordingly, the expected dynamic range is about 96 dB. Since there are 16 states to the integer data, each stage represents about a 6 dB change. In this way, the shifting process 422 may be used to roughly set the gain or attenuation, but at only about a 6 dB resolution. However, the CDMA standards require about a 0.2 dB resolution. Accordingly, the fractional part 413 is received into multiplication process 425. The fractional part is five bits, which represents 32 possible states (0-31). These 32 states are then used to interpolate between the 6 dB integer points, which results in a resolution of better than 0.2 dB. For a further adjustment, a lookup table 427 may be provided corresponding to the fractional part 413. Since each natural interpolation point of the fractional data may not coincide precisely with desired resolution points, the lookup table may be used to make even finer adjustments to the interpolation between the coarse points. Accordingly, the multiplication block 425 accepts the data from the shift register, and multiplies it by the fractional part and the lookup table value 429, if any. The output from the multiply block 425 is then passed to block 430, where the signal is further conditioned. Block 430 then outputs the gain adjusted digital data 432. Advantageously, AGC 400 enables a dB linear gain control with highly accurate and adaptable resolution. It will be appreciated that the dynamic range, coarse resolution, and fine resolution may be readily adjusted. For example, finer resolution may be obtained by increasing the number of bits in the fractional part.

Figure 9:
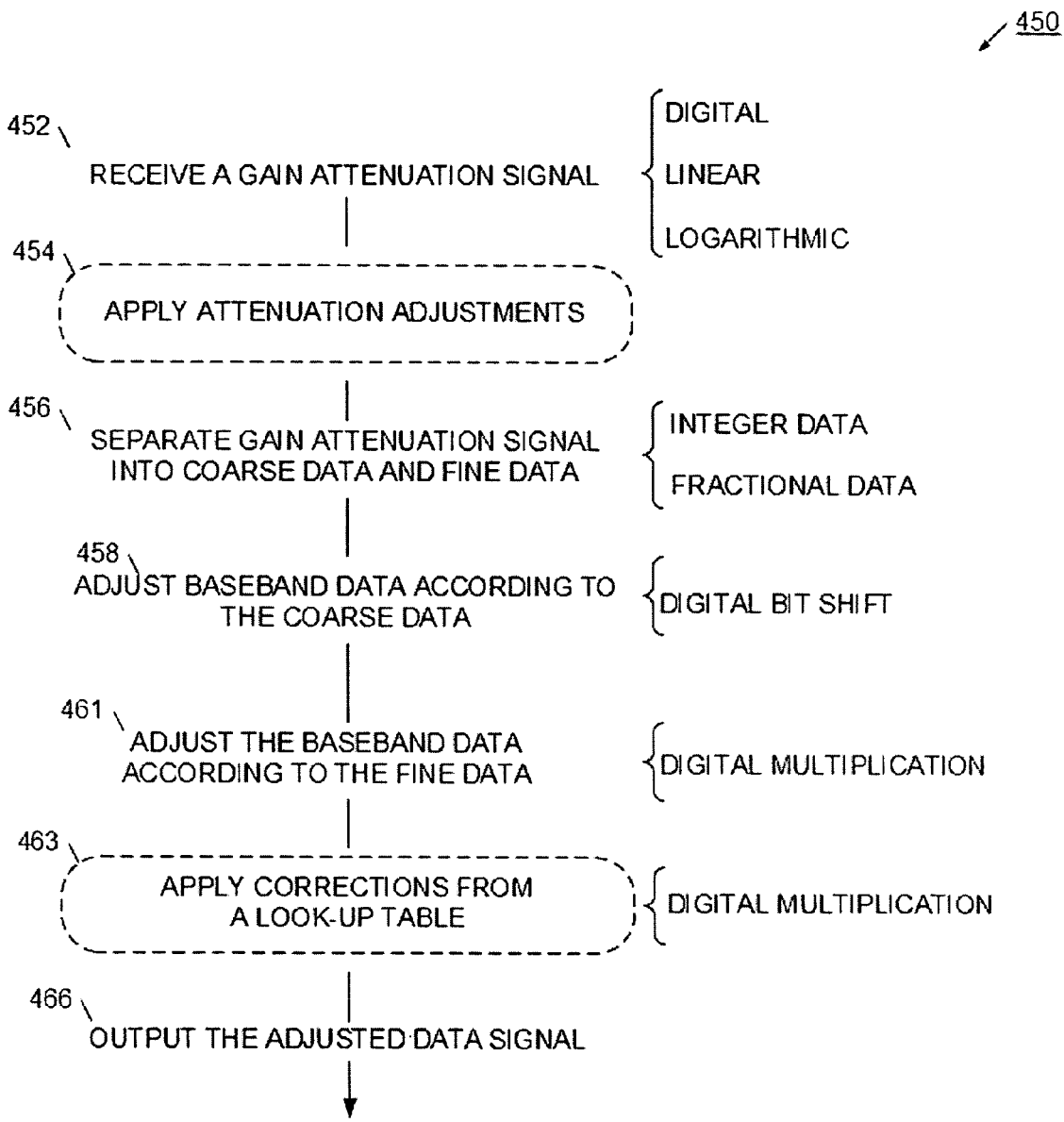
FIG. 9 is a flowchart of an AGC process for a wireless receiver in accordance with the present invention.

Referring to now to FIG. 9, a method for automatic gain control 450 is illustrated. Method 450 receives a gain attenuation signal as shown in block 452. This signal is digital, or is provided in an analog form and then converted to digital form, and may provide for either a linear or dB linear gain control. As shown in block 454, attenuation adjustments may be made to the attenuation signal. These adjustments may be made primarily for calibration purposes, or may be provided from other sections of the radio in real-time. The attenuation signal is then separated into coarse data and fine data as shown in block 456. In one example, the coarse data is an integer data and the fine data is a fractional data. The coarse data is then used to provide a coarse adjustment of the baseband signal as shown in block 458. In one example, the integer data is used to set the number of bits the digital data is shifted. In a particular example, if the overall dynamic range is 96 dB, and 16 available integers are used, then each integer shift will represent a 6 dB change. However, a 6 dB resolution is not sufficient for some communication standards, so finer adjustment may be needed. Accordingly, the digital baseband data is adjusted according to the fine fractional data as shown in block 461. The fractional data is used to interpolate between the rough gain points set by the coarse data. For even more accurate setting of the fine resolution, corrections may be made using a lookup table as shown in block 463. These corrections are used in conjunction with the fine data to adjust the digital data stream. The gain adjusted digital data stream is then output as shown in block 466.

Figure 10:
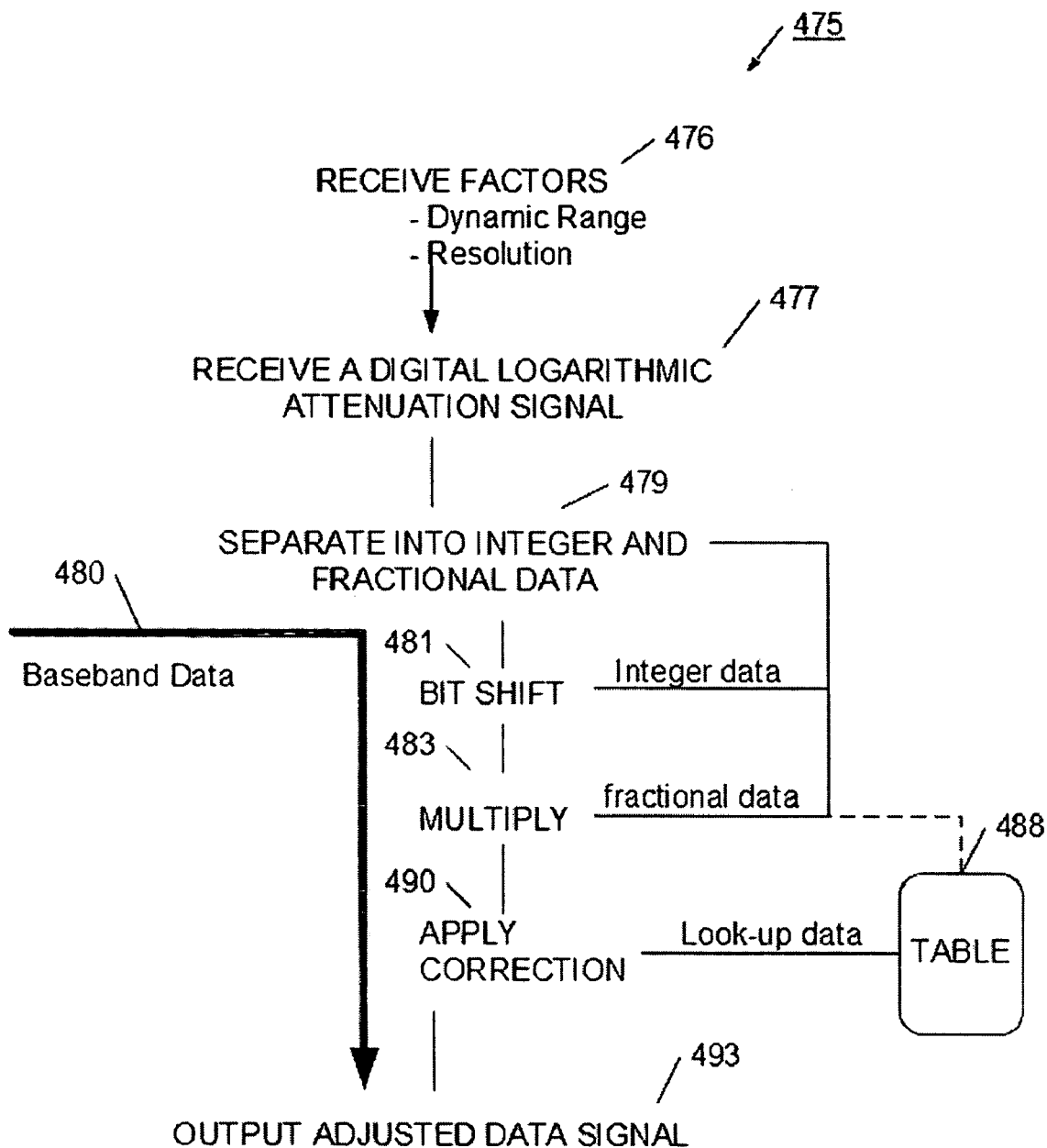
FIG. 10 is a flowchart of an AGC process for a wireless receiver in accordance with the present invention.

Referring now to FIG. 10, an AGC process is illustrated. The AGC process 475 is well-suited for use in a communications receiver 10 as illustrated in FIG. 1. The AGC process 475 receives factors 476 particular to the communication standard selected for use. For example, if the control 25 in FIG. 1 selects a CDMA telecommunication standard, then the AGC factors 35 of FIG. 1 would set the dynamic range and resolution coefficients appropriate to CDMA. Referring back to FIG. 10, these coefficients, such as dynamic range and resolution, are received in block 476. In one example, CDMA factors set the CDMA dynamic range to about 96 dB, while the resolution is set to better than about 0.2 dB. As shown in block 477, the AGC receives a digital logarithmic attenuation signal. This signal is generated in another section of the radio circuit, and is intended to cause the AGC to attenuate or amplify data in the digital communication stream 480.

The attenuation signal is separated into integer and fractional data as shown in block 479. Continuing the CDMA example, the integer data was selected to be in the range of 0 to 15, thereby providing 16 available states. For a 96 dB dynamic range, this means each integer represents about a 6 dB change. In a similar manner, the fractional data was selected to be in the range 0 to 31, thereby having 32 available states. Since the 32 states are equally distributed over the 6 dB, each state represents less than 0.2 dB resolution. It will be appreciated that the relationship between the integer data steps and the fractional data steps may be adjusted according to the overall dynamic range and resolution needed to implement a particular standard. In this way, the relationship between the number of bits in the integer data and the number of bits in the factional data may be adjusted according to the received factors. In block 481, the integer data is used to shift bits in the digital data stream 480. As described above, the bit shift process 481 obtains a resolution of about 6 dB in a CDMA setting. However by multiplying the digital datastream with the fractional data in block 483, a resolution less than 0.2 dB may be obtained.

Finally, dependent on the particular standard to be implemented, adjustments may be made according to the fractional data. For example, in the example of implementing a CDMA system with 32 states (5 bits) of fractional data, the resulting resolution is less than about 0.2 dB per step. However, it may be desirable to implement a step resolution closer to 0.2 dB. In this way, each of the fractional steps may have a correction factor associated with it to more closely align with the 0.2 dB resolution requirements. A lookup table 488 may hold these correction factors, and according to the fractional data, would apply a correction to the digital data 480 as shown in block 490. The gain adjusted data signal is then output as shown in block of 493.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A communication receiver, comprising:
   a plurality of analog RF (radio frequency) front end modules, each constructed to provide a respective analog communication signal;
   a memory storing sets of factors, each set of factors being associated with one of the front end modules;
   a control circuit arranged to select one of the plurality of front end modules and select the set of factors associated with that front end module;
   a digital backend module arranged to receive the analog communication signal from the selected front end module and generate a digital baseband signal, the digital backend module having a digital automatic gain control (AGC); and
   the digital backend module operating the steps of:
      receiving the analog communication signal from the selected front end module;
      using the selected set of factors associated with the selected front end module, including digital AGC coefficients, to digitally process the received analog communication signal, wherein the digital AGC receives a digital adjustment signal and a digital data signal, separates the digital adjustment signal into a coarse data and a fine data, adjusts the gain of the digital data signal according to the coarse data, and adjusts the gain of the digital data signal according to the fine data; and
      generating a digital baseband signal.

2. The communication receiver according to claim 1, wherein the plurality of analog RF front end modules includes at least two modules selected from a group consisting of a CDMA module, a WCDMA module, a UMTS module, a GSM module, a PCS module, a cellular module, and a GPS module.

3. The communication receiver according to claim 1, wherein the digital backend module further includes an A/D (analog to digital) converter, and the A/D converter operates according to coefficients provided in the selected set of factors.

4. The communication receiver according to claim 1, wherein the digital backend module further includes a down-sampler, and the down-sampler operates according to coefficients provided in the selected set of factors.

5. The communication receiver according to claim 1, wherein the digital backend module further includes a channel filter, and the channel filter operates according to coefficients provided in the selected set of factors.

6. The communication receiver according to claim 1, wherein the digital AGC is constructed to implement a dB linear gain.

7. The communication receiver according to claim 6, wherein the digital AGC is constructed to implement a resolution of less than 0.2 dB.

8. The communication receiver according to claim 1, wherein the coarse data is integer data and the coarse data adjustment includes a bit shift process.

9. The communication receiver according to claim 1, wherein the fine data is fractional data and the fine data adjustment includes a multiplication process.

10. A method of generating a digital baseband signal, comprising:
   providing a receiver having a plurality of analog RF (radio frequency) front end modules, each capable of providing a respective analog communication signal;
   providing sets of predefined factors, each set of factors associated with one of the analog front end modules;
   selecting a single one of the analog front end modules and its associated set of factors;
   switching the analog communication signal from the selected analog front end module to a digital backend module, the digital backend module having a digital automatic gain control (AGC);
   configuring the backend module using the selected set of factors, the selected set of factors including AGC coefficients for configuring the AGC, wherein the digital AGC receives a digital adjustment signal and a digital data signal, separates the digital adjustment signal into a coarse data and a fine data, adjusts the gain of the digital data signal according to the coarse data, and adjusts the gain of the digital data signal according to the fine data; and
   generating the digital baseband signal according to the selected set of factors.

11. The method of generating a digital baseband signal according to claim 10, wherein the plurality of analog RF front end modules includes at least two modules selected from a group consisting of a CDMA module, a WCDMA module, a UMTS module, a GSM module, a PCS module, a cellular module, and a GPS module.

12. The method of generating a digital baseband signal according to claim 10, further including the step of operating an A/D (analog to digital) convener according to coefficients provided in the selected set of factors.

13. The method of generating a digital baseband signal according to claim 10, further including the step of operating a down-sampler according to coefficients provided in the selected set of factors.

14. The method of generating a digital baseband signal according to claim 10, further including the step of operating a channel filter according to coefficients provided in the selected set of factors.

15. A communication receiver, comprising:
   a first analog RF (radio frequency) front end module constructed to provide a first analog communication signal;
   a second analog RF (radio frequency) front end module constructed to provide a second analog communication signal;
   a control circuit arranged to select one of the analog front end modules;
   a switch acting responsive to the control circuit, the switch configured to select the analog communication signal from the selected front end module;
   a digital backend connected to the switch and arranged to receive the selected analog communication signal, the digital backend including a digital automatic gain control (AGC); and
   the digital backend operating the steps of:
      receiving the analog communication signal from the selected front end module;
      digitally processing the received analog communication signal according to a first set of digital factors when the first analog front end module is selected, the first set of digital factors including AGC coefficients for configuring the AGC, wherein the digital AGC receives a digital adjustment signal and a digital data signal, separates the digital adjustment signal into a coarse data and a fine data, adjusts the gain of the digital data signal according to the coarse data, and adjusts the gain of the digital data signal according to the fine data;
      digitally processing the received analog communication signal according to a second set of digital factors when the second analog front end module is selected, the second set of digital factors including AGC coefficients for configuring the AGC, wherein the digital AGC receives a digital adjustment signal and a digital data signal, separates the digital adjustment signal into a coarse data and a fine data, adjusts the gain of the digital data signal according to the coarse data, and adjusts the gain of the digital data signal according to the fine data; and
      generating a digital baseband signal.

16. The communication receiver according to claim 15, wherein the first and second analog RF front end modules are each selected from a group consisting of a CDMA module, a WCDMA module, a UMTS module, a GSM module, a PCS module, a cellular module, and a GPS module.

17. The communication receiver according to claim 15, wherein the digital backend module further includes:
   an A/D converter operating according to coefficients in the selected set of digital factors;
   a down-sampler operating according to coefficients in the selected set of digital factors; and
   a channel filter operating according to coefficients in the selected set of digital factors.

18. A communication receiver, comprising:
   a plurality of analog RF (radio frequency) front end modules, each front end module constructed to provide a respective analog communication signal;
   a digital backend arranged to selectively receive an analog communication signal from one of the front end modules, the digital backend including a digital automatic gain control (AGC); and
   the digital backend operating the steps of:
   digitally processing the received analog communication signal according to a set of digital factors associated with the selected front end module, the selected set of digital factors including AGC coefficients for configuring the AGC, wherein the digital AGC receives a digital adjustment signal and a digital data signal, separates the digital adjustment signal into a coarse data and a fine data, adjusts the gain of the digital data signal according to the coarse data, and adjusts the gain of the digital data signal according to the fine data; and
   generating a digital baseband signal.

19. The communication receiver according to claim 18, wherein the analog RF front end modules are each selected from a group consisting of a CDMA module, a WCDMA module, a UMTS module, a GSM module, a PCS module, a cellular module, and a GPS module.

* * * * *